2 Sheets—Sheet 1.
W. SELLERS & J. S. BANCROFT,
Said BANCROFT assignor to said SELLERS.
Injector.
No. 9,407. Reissued Oct. 12, 1880.
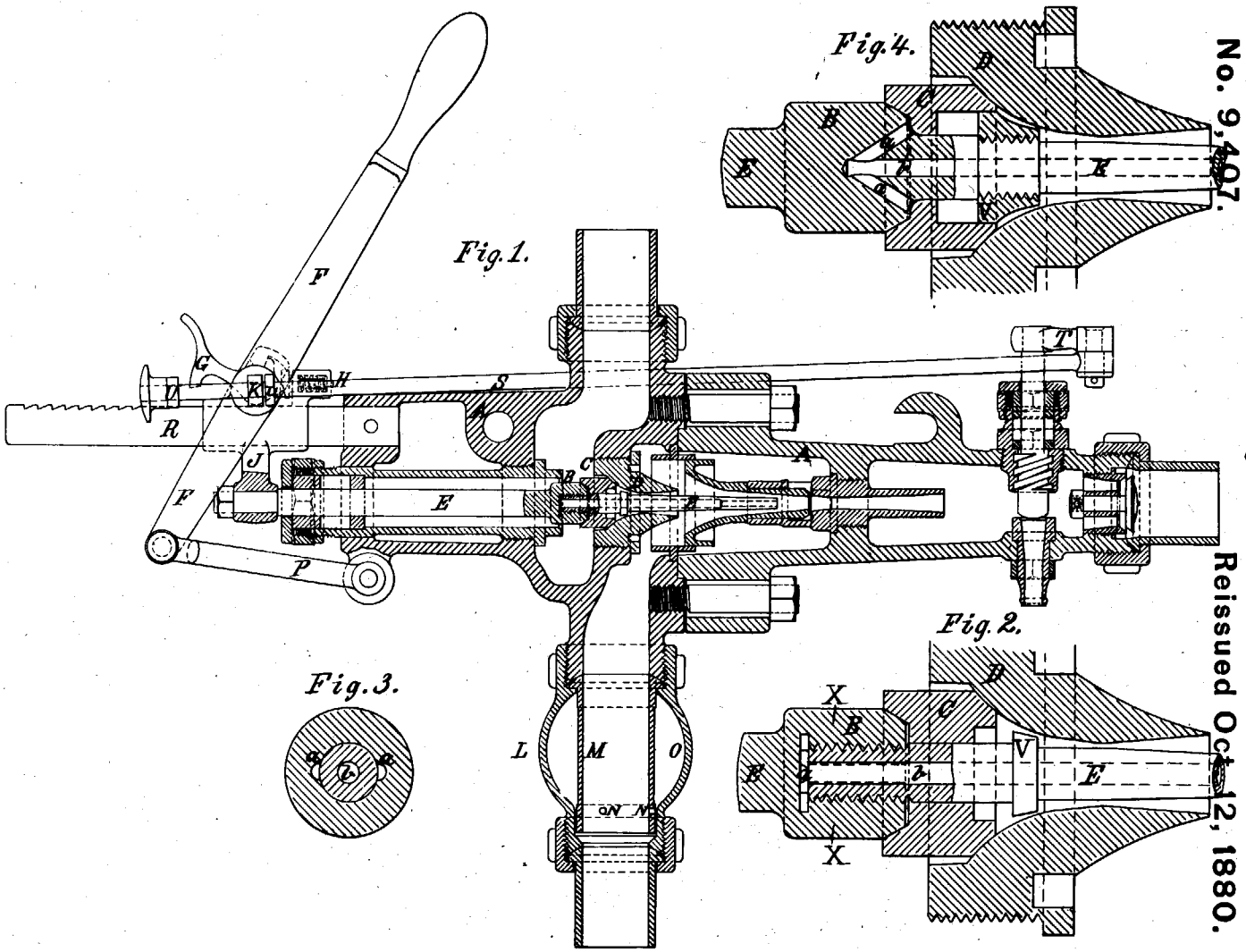
*Witnesses:*
N. S. Fulton
Jno. Fulton
*Inventors:*
Wm. Sellers
J. Sellers Bancroft

W. SELLERS & J. S. BANCROFT,
Said BANCROFT assignor to said SELLERS.
Injector.
No. 9,407. Reissued Oct. 12, 1880.
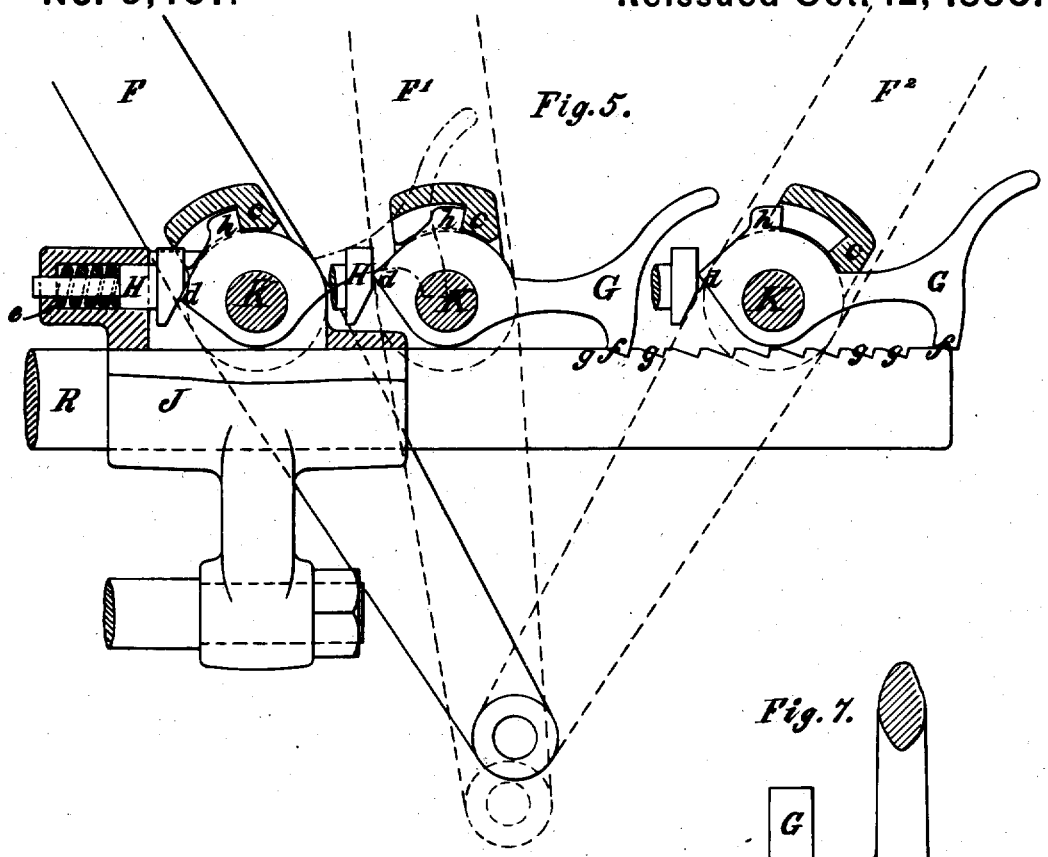
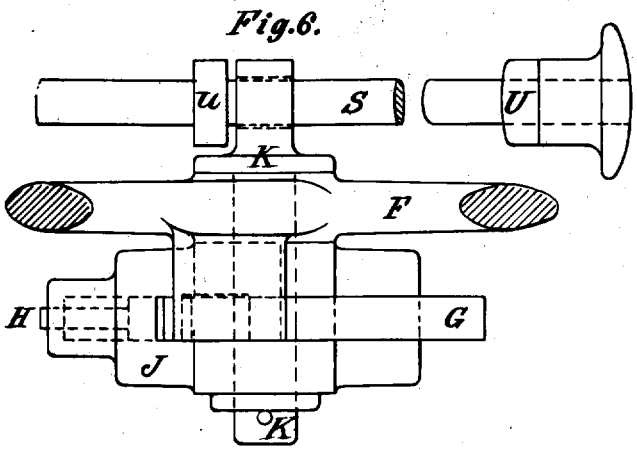
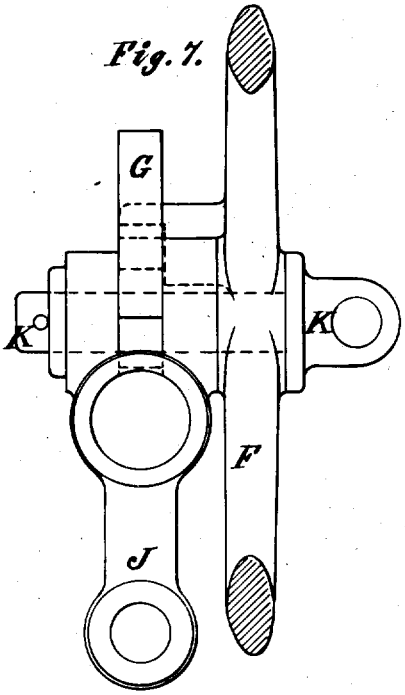
Witnesses:
N. A. Fulton
J. McFadden
Inventors:
Wm. Sellers
J. Sellers Bancroft

UNITED STATES PATENT OFFICE.

WILLIAM SELLERS AND J. SELLERS BANCROFT, OF PHILADELPHIA, PA.; SAID BANCROFT ASSIGNOR TO SAID SELLERS.

INJECTOR.

SPECIFICATION forming part of Reissued Letters Patent No. 9,407, dated October 12, 1880.

Original No. 208,425, dated September 24, 1878. Application for reissue filed January 9, 1879.

*To all whom it may concern:*

Be it known that we, WILLIAM SELLERS and J. SELLERS BANCROFT, of the city and county of Philadelphia, in the State of Pennsylvania, have jointly invented certain new and useful Improvements in the Construction and Operation of Injectors for Feeding Boilers; and we declare the following to be a full and exact description and specification thereof.

Some of the improvements are applicable to all forms of injectors; but as all of them are applicable to the self-adjusting injector described in the United States Patent No. 141,173, granted to William Sellers July 22, 1873, the drawings represent this form of injector.

It has been found in practice, on locomotives especially, that in the self-adjusting injectors as constructed previous to our present invention the jet of water is liable to be broken by sudden jars or shocks when running at high speeds over rough tracks.

In the self-adjusting injector the combining-tube, and consequently the column of water flowing to the injector, are frequently thrown into vibrations or oscillations by irregular condensation of the steam-jet, or from external causes, and violent shocks are liable to produce these vibrations of the water-supply in all injectors. In the self-adjusting injector these vibrations, when once started, continue regularly, with a constantly-increasing intensity, until the jet is so much disturbed that it is broken and the injector ceases to work.

We discovered that with a self-adjusting combining-tube the vibration caused by a shock not sufficient to produce this effect in the first instance, yet being imparted to and transmitted through the column of water flowing to the injector, was amplified with the distance traversed until it agitated such a body of water as to break the jet, and we discovered that this was due to the fact that the column of water flowing to the injector was rigidly confined. It is the object of the first branch of our invention to prevent this transmission of shock to any considerable distance through the column of water flowing to the injector; and to this end our invention consists in modifying the rigid confinement of the column of water flowing to the injector by means of an elastic medium more susceptible of vibration than the column itself, and which will therefore prevent the transmission of shock beyond the elastic medium, while the vibrations set up by the shock, having their regularity interfered with by the elastic medium, are speedily arrested. This object we accomplish in the best mode known to us by the use of an air-chamber constructed and combined with the injector, as hereinafter particularly described; but we contemplate using instead of this air-chamber other devices, also more particularly described hereinafter.

One object of our invention is to simplify the manipulation required for starting, regulating, and stopping injectors, so that by the movement of one lever the water can be lifted, the injector started, the amount of water regulated, and the injector stopped, thus making it much safer for use on locomotives, as the engineer is by this invention enabled to use the injector without taking his attention from the road.

In order more fully to describe our present invention, we will now refer to the drawings, which represent an injector embodying our present improvements.

Figure 1, Sheet 1, is an elevation of the injector, partly in section, in which A is the outer shell or casing of the instrument, and is made up of parts put together so as to form a continuous closed casing, substantially as described in Letters Patent No. 75,059, issued to William Sellers under date of March 3, 1868. Fig. 2 is a longitudinal section on an enlarged scale through the lifting-valve B, valve C, provided with valve-seat, steam-plug E, and receiving-tube D. Fig. 3 is a section through the lifting-valve B and steam-plug E on the line *x x*, Fig. 2. Fig. 4 shows a different method of constructing the parts shown in Fig. 3. Fig. 5, Sheet 2, is an enlarged view of the regulating-lever and attachments, shown in three different positions. Fig. 6 is a plan, and Fig. 7 an end view, of the parts shown in Fig. 5.

Similar letters refer to similar parts.

In Fig. 1, L is the outside shell or body of the air-chamber, which is screwed to the water-branch of the injector, clamping the flanged end of the inside tube, M, so as to form an air-tight joint. The tube M forms a continuation of the water-supply pipe, and its lower end has an annular space between it and the body L, forming a conduit to allow the passage of air and water into and out of the air-chamber O, formed between the body L and tube M, so that the air-chamber will surround the water-supply pipe. The tube M has small holes N drilled through it at the top of the annular space, forming conduits, as shown, to facilitate the escape of water that may collect in the air-chamber O.

The size of the conduits formed by the annular space and the holes N is very important. If too large, the vibrations will not be sufficiently checked, and if too small the water which may collect in the chamber will not readily escape.

The shape of the conduits is not essential, as the air-chamber can be connected to the water-supply by small tubes, provided the united area of these conduits is not too great, and in any case the conduits are so placed that one will open into the air-chamber above the other to facilitate the escape of water.

In practice we find that the area of these conduits should be contracted so as not to exceed the area of the water-supply pipe divided by the smallest diameter of the discharging-tube in millimeters.

The cubical contents of the air-chamber should be about five cubic inches per millimeter of diameter of discharging-tube, or about twenty cubic inches per inch of diameter of the water-supply pipe. The case L of this air-chamber is made separate from the injector, so that it may always be placed in a vertical position and coupled direct, as shown, when the injector is horizontal, or by an elbow when the injector is placed in any other position. It is necessary that the case L be kept as near the temperature of the feed-water as possible, and not allowed to become heated by conduction from the steam-chamber.

The water-branch of the injector, as shown in Fig. 1, is cooled by the passage of the feed-water through it, and so prevents the transmission of the heat, which would otherwise be conducted to the case L.

The regulating steam-plug E is constructed with a central discharge for the purpose of lifting the water, as described in United States Patent No. 75,059, granted to Wm. Sellers March 3, 1868, and the outer end of this plug E is secured to the guiding cross-head J, which slides upon and is guided by the guide-bar R, fixed securely in the casing A and parallel with the axis of the steam-plug E.

The regulating-lever F is coupled to the injector-casing A by the swinging link P, in which it has its fulcrum, and to the cross-head J by the pin K, whereby the cross-head will be prevented from turning about the axis of the guide-bar, so that the steam-plug will be guided laterally by the cross-head, and its parallelism with the guide-bar R will be maintained in every direction, while the movement of the vibrating lever will be confined to a plane parallel with the axis of the steam-plug.

The main valve C is constructed so as to slide freely upon the steam-plug E, and is adapted to be seated upon the receiving-tube D. The back of this valve is constructed so as to form a valve-seat for the water-lifting valve B upon the steam-plug E. The diameters of these valves are so proportioned that the pressure in the steam-chamber holds them firmly to their seats, preventing any escape of steam, thereby dispensing with the use of any auxiliary steam-valve for the purpose of stopping, starting, or regulating. If the lever be drawn out so as to raise the lifting-valve B from its seat, steam will then flow between the valves B and C, through the passages *a a* in the steam-plug E, and out through the central hole, *b*, in the steam-plug E, and this first movement of the lever thus admits the flow of steam, so as to start the lifting-jet and draw the water to the combining-tube. As soon as water appears at the waste the lever F is drawn slowly out, lifting the main valve C by the collar V on the steam-plug E, and this further movement of the lever induces a forcing-jet by admitting a sufficient supply of steam to carry the water into the boiler. As the lever F is pulled out the sliding-stop connecting-rod S, coupled to the arm T of the waste-valve, closes the screw waste-valve, the cross-head pin K, through which the rod S slides freely, operating against the stop *u* on the end of the rod S. The lever F is now in the position shown by $F^2$, Fig. 5, and the automatic retaining-pawl G is pushed down by the projection or lug *c* on the lever F until the point *d* comes enough above the center of the pin K for the plunger H, pushed forward by the spiral spring *e*, to keep the point *f* of the pawl G firmly pressed against the guide-bar R, which is notched on its upper surface, as shown at *g g*.

If the lever F be pushed in, the regulating steam-plug E will diminish the amount of steam, and the point *f* of the retaining-pawl G, engaging with the notches *g g*, will hold the steam-plug E in the desired position against the pressure of the steam on the area of the steam-plug E, tending to force it out. When the lever F is in the position F′ the lug *c* touches the spur *h* on the pawl G without raising *f* out of the last notch *g′*. In this position the regulating-plug E has reduced the steam to the minimum amount with which the injector will work, and if it is pushed in farther the jet will be broken, unless the waste-valve be opened. At this point, therefore, the stop *u* on the sliding-stop connecting-rod S is touched by the cross-head pin K. The lever F is now pushed into the position shown at F. The lug *c* raises the pawl G by the spur *h* until the point *d* passes onto the incline on the head of the plunger H, which will now hold the pawl G in this position, so that it will not engage with the notches *g* until drawn out to the end of the guide-bar R by the lever F in again starting the injector. If, after the lever F has been pushed in to diminish the amount of water thrown, it is desired to increase the amount, the pawl G may be raised by hand, when the steam-pressure will force out the steam-plug E; or the lever F may be pushed into a position between F and F′, so as to latch the pawl G up without entirely cutting off the steam-supply, and then drawn out to the full extent. When the lever F is pushed in all the way the valves B and C are again seated the waste-valve is opened wide, the water drains back through the supply-pipe, and the air-chamber O is emptied of water and replenished with air.

The regulating steam-plug E may be made in one piece, as shown in Fig. 4, with the collar V screwed on after the main valve C is in its place; or it may be made in two pieces, as in Fig. 2, where the collar V is solid with the lower part of the steam-plug E and the two parts are screwed rigidly together, as shown in the lifting-valve B. This latter method is preferred, because the hole *b* through the steam-plug E may be made larger, as shown in Fig. 1, until just before it reaches the point of delivery, thus increasing the velocity of the jet and facilitating the lifting of the water, and also lessening the cost of constructing.

In all injectors in which the waste required to start the jet takes place between the combining and delivery tubes the waste ceases with the formation of the jet, and no waste-valve is required, so that in such injectors the first movement of the lever F will start the lifting-jet to bring the water to the injector, its further movement will start the forcing-jet, and with its extreme movement in the same direction the jet can be regulated, and the final movement in the opposite direction will shut off the steam and stop the operation; but in all injectors which, from their construction, require that the waste shall take place after the water has passed the delivery-tube, as in the case represented in the drawings, a waste-valve must be provided which must be open during the operation of starting the jet, and after the starting is effected this valve must be closed to compel the water to enter the boiler; and in all such injectors the operation of the lever will be as hereinbefore described—that is to say, the first movement of the lever will start the lifting-jet to bring the water to the injector, its further movement will start the forcing-jet, and its extreme movement in the same direction must close the waste-valve to compel the water to enter the boiler, and the final movement in the opposite direction will open the waste-valve, shut off the steam, and stop the operation.

As already mentioned, we have described the first branch of our invention in the best form known to us; but we contemplate using other devices for the same purpose as is subserved by the air-chamber, and operating upon the same principle—that is to say, modifying the rigid confinement of the column of water flowing to the injector by means of an elastic medium. Among such other devices we specify as substitutes or equivalents for the air-chamber a cock which will admit air to the supply-pipe and regulate its quantity; or a short section of flexible supply-pipe—such as rubber hose—connected to the injector, will afford sufficient elasticity; or an elastic diaphragm of sheet metal or rubber, forming one side of the supply-pipe, will operate with the same effect.

As to the other branch of our invention, we are aware that a lifting-jet and a forcing-jet have been operated successively in the same injector by a screw, which also served to regulate the supply of steam to the instrument; but the movement required demanded too many turns of the screw, which was therefore too slow; or if this was remedied by increasing the pitch, the pressure of steam forced it outward and deranged the adjustment of the instrument. Moreover, it required very close attention upon the part of the operator to readjust the steam discharged to any desired quantity every time the instrument was started or after its performance had been modified for any cause, all of which objections are obviated by the adaptation of the lever in place of the screw, as any movement of the lever in operating the lifting or forcing jet may be made in the time required for giving one turn to the screw, while the movement of the lever-handle toward and from the injector being so much greater than that of the screw-handle, a small variation in the steam adjustment is plainly indicated to the eye, not only by this distance, but also by the variation of the angle of the lever to the axis of the injector.

We are aware that it has been proposed to operate these jets successively in the same injector by a revolving cock or valve controlled by a lever; but these proposed constructions are incompatible with the use of a steam-plug; and the steam-plug being the most perfect form of adjustment, it is the object of our improvement to retain it and combine with it the advantages of the lever adjustment above described, which differs from that shown in the patent of William and Coleman Sellers, No. 141,174, dated July 22, 1873, in which patent, while a lever starts the lifting and forcing jets successively and stops the operation of the injector, the regulation is effected by an independent screw adjustment, whereas in our present improvement the single lever not only starts the lifting and forcing jets successively and stops the operation of the injector, but it also effects the regulation, and we only claim herein, as to this feature of our improvement, a lever which alone serves these purposes, without the addition of an independent screw adjustment, such as is shown and described in said Patent No. 141,174.

What we claim as new, and desire to secure by Letters Patent, is—

1. In an injector, the combination of a water-supply pipe, an air-chamber, and a contracted conduit between the air-chamber and the water-supply pipe, substantially as and for the purposes set forth.

2. In an injector, the combination of a water-supply pipe, an air-chamber, and two contracted conduits, the one above the other, substantially as and for the purposes set forth.

3. In an injector, the combination of a water-supply pipe with an air-chamber which surrounds the water-supply, substantially as and for the purposes set forth.

4. In a self-adjusting injector, the method of modifying the rigid confinement of the column of water flowing to the injector by means of an elastic medium, substantially as and for the purposes set forth.

5. In an injector, a lever the movements of which will lift the water, start the jet, and close the waste-valve, substantially as and for the purposes set forth.

6. In an injector, a lever the movements of which will lift the water, start the jet, and stop the operation of the injector, substantially as and for the purposes set forth.

7. In an injector, the combination, with a central-discharge steam-plug, of a valve, substantially as described, sliding thereon, for the purposes set forth.

8. In an injector, the combination of a regulating steam-plug, a fixed guide-bar, and a cross-head, substantially as described.

9. In an injector, the combination of a regulating steam-plug, a fixed guide-bar, a guiding cross-head, and a regulating-lever, substantially as described.

10. In an injector, the combination of a regulating steam-plug, a fixed guide-bar, a cross-head, and a retaining-pawl, substantially as described.

11. In an injector, the combination of a regulating steam-plug, a fixed guide-bar, a cross-head, a regulating-lever, and an automatic retaining-pawl, substantially as described.

12. In an injector, the combination of a guiding cross-head, a screw waste-valve, and a sliding-stop connecting-rod, substantially as described.

WM. SELLERS.
J. SELLERS BANCROFT.

Witnesses:
JAS. H. SCHNACKE,
H. A. FULTON.